(12) United States Patent
Wu et al.

(10) Patent No.: US 11,834,277 B2
(45) Date of Patent: Dec. 5, 2023

(54) MULTI-STATION CAM CARRYING MECHANISM

(71) Applicant: SUZHOU RS TECHNOLOGY CO., LTD, Jiangsu (CN)

(72) Inventors: Jiafu Wu, Suzhou (CN); Lei Miao, Suzhou (CN); Haibin Sun, Suzhou (CN); Caiguang Lu, Suzhou (CN); Longhai Liu, Suzhou (CN)

(73) Assignee: SUZHOU RS TECHNOLOGY CO., LTD, Suzhou (CN)

( * ) Notice: Subject to any disclaimer, the term of this patent is extended or adjusted under 35 U.S.C. 154(b) by 595 days.

(21) Appl. No.: 17/059,329

(22) PCT Filed: Nov. 29, 2018

(86) PCT No.: PCT/CN2018/118278
§ 371 (c)(1),
(2) Date: Nov. 27, 2020

(87) PCT Pub. No.: WO2020/034490
PCT Pub. Date: Feb. 20, 2020

(65) Prior Publication Data
US 2021/0198054 A1    Jul. 1, 2021

(30) Foreign Application Priority Data
Aug. 15, 2018  (CN) .......................... 201810926501.0

(51) Int. Cl.
*B65G 47/90*  (2006.01)
*B65G 47/91*  (2006.01)

(52) U.S. Cl.
CPC .................................. *B65G 47/914* (2013.01)

(58) Field of Classification Search
CPC ..... B65G 47/90; B65G 47/902; B65G 47/914
(Continued)

(56) References Cited

U.S. PATENT DOCUMENTS 4,964,497 A * 10/1990 Bundo .................. B23P 21/008
                                                         198/346.2
9,522,790 B2 * 12/2016 Wilson ................... B65G 47/80
(Continued)

FOREIGN PATENT DOCUMENTS

| CN | 107538474 | * | 1/2018 |
| CN | 207359099 | * | 5/2018 |

(Continued)

OTHER PUBLICATIONS

U.S. 2022/0185598 A1, Osswald et al., Jun. 16 (Year: 2022).*

*Primary Examiner* — Douglas A Hess
(74) *Attorney, Agent, or Firm* — Oliff PLC

(57) ABSTRACT

A multi-station cam carrying mechanism, including a baseplate, a rotary shaft in the middle of the baseplate, an electric motor connected to the bottom of the rotary shaft, a rotary plate at an upper part of the rotary shaft, mounting frames on the baseplate, a mounting plate on the mounting frames, an annular sliding groove on a bottom face of the mounting plate along a cam trajectory, and multiple grabbing and transferring assemblies annularly and uniformly arranged at intervals, with bottom parts slidably arranged on the rotary plate and top parts slidably arranged in the sliding groove. The electric motor drives multiple stations to carry products simultaneously, and undergoes a reciprocating movement along the cam trajectory, grabhooks on the assemblies reciprocate vertically to grab and transfer the products, so that the products are sequentially transferred from one station to the next station.

10 Claims, 4 Drawing Sheets

(58) Field of Classification Search
USPC .......................................................... 198/399
See application file for complete search history.

(56) References Cited

U.S. PATENT DOCUMENTS

| | | | | |
|---|---|---|---|---|
| 9,527,678 B2 * | 12/2016 | Santi | ................... | B65G 47/248 |
| 10,138,073 B2 * | 11/2018 | Fallon | .................. | B65G 47/681 |

FOREIGN PATENT DOCUMENTS

| | | | |
|---|---|---|---|
| CN | 111203696 | * | 5/2020 |
| CN | 113734798 | * | 12/2021 |
| CN | 114634014 | * | 6/2022 |

* cited by examiner

MULTI-STATION CAM CARRYING MECHANISM

BACKGROUND

Technical Field

The present invention relates to the field of carrying apparatuses, and in particular to a multi-station cam carrying mechanism.

Related Art

In modern automated production lines, automated mechanical carrying mechanisms are often used for automatic carrying to improve the production efficiency. The work of the existing carrying mechanism is often of the arrangement in a straight line, and various stations are sequentially arranged in a straight line. This type of carrying mechanism has the following main defects: the space occupied by the apparatus is large, which is not beneficial to the miniaturization of the apparatus, and the production efficiency is low, so it is difficult to meet the needs of many existing automated production lines.

SUMMARY

The technical problem to be solved by the present invention is to provide a multi-station cam carrying mechanism in view of the above defects in the prior art.

In order to solve the above technical problem, the technical scheme adopted by the present invention is as follows: a multi-station cam carrying mechanism includes a baseplate, a rotary shaft arranged in the middle of the baseplate, an electric motor in driving connection with the bottom of the rotary shaft, a rotary plate arranged at an upper part of the rotary shaft, mounting frames arranged on the baseplate, a mounting plate arranged on the mounting frames, an annular sliding groove provided on a bottom face of the mounting plate along a cam trajectory, and a plurality of grabbing and transferring assemblies annularly and uniformly arranged at intervals, with bottom parts thereof being slidably arranged on the rotary plate and top parts thereof being slidably arranged in the sliding groove.

The electric motor is configured to drive the rotary plate to rotate so as to drive the grabbing and transferring assemblies to undergo a reciprocating movement along the cam trajectory under the limitation of the sliding groove.

The mounting plate is further provided with air cylinders for driving grabhooks on the grabbing and transferring assemblies to undergo a vertical movement.

Preferably, the grabbing and transferring assembly includes a bracket, a horizontal sliding block arranged at the bottom of the bracket, a vertical sliding rail arranged on a side of the bracket, a vertical sliding block slidably arranged on the vertical sliding rail, grabhooks arranged on the vertical sliding block, and a bearing arranged at the top of the bracket and configured to be matched with and inserted in the sliding groove.

Preferably, the rotary plate is provided with a horizontal sliding rail matched with the horizontal sliding block.

Preferably, the horizontal sliding block is further connected to a horizontal spring, and the other end of the horizontal spring is connected to a first spring seat arranged on the rotary plate.

Preferably, the bracket is further connected to a vertical spring, and the other end of the vertical spring is connected to a second spring seat arranged on the vertical sliding block.

Preferably, the mounting plate and the bracket are both provided with holes for a drive rod at a lower part of the air cylinder to pass through, and the drive rod at the lower part of the air cylinder is configured to press the vertical sliding block so as to drive the grabhooks on the vertical sliding block to undergo a vertical reciprocating movement under the cooperation of the vertical spring.

Preferably, a surface of the baseplate is provided with a photoelectric switch, and a bottom face of the rotary plate directly below the grabbing and transferring assembly is provided with a stop plate matched with the photoelectric switch.

Preferably, the side of the bracket is further provided with an upper limit stud and a lower limit stud, and a side of the vertical sliding block is provided with a limit stop block located between the upper limit stud and the lower limit stud.

Preferably, there are eight grabbing and transferring assemblies annularly and uniformly arranged on the rotary plate at intervals so as to form eight grabbing and transferring stations on the rotary plate.

Preferably, the sliding groove includes eight arc-shaped protruding portions annularly and uniformly arranged at intervals and respectively corresponding to positions of the grabbing and transferring assemblies.

The present invention has the following beneficial effects: in the multi-station cam carrying mechanism of the present invention, the electric motor drives a plurality of stations to carry products simultaneously, and while the grabbing and transferring assemblies undergo a reciprocating movement along the cam trajectory, grabhooks on the grabbing and transferring assemblies undergo a vertical reciprocating movement so as to grab and transfer the products, so that the products are sequentially transferred from one station to the next station. The present invention has a compact structure, reduces the size of an apparatus, improves the transferring efficiency, works stably and has a good effect when in use.

DESCRIPTION OF THE REFERENCE NUMERALS

Figure 1:
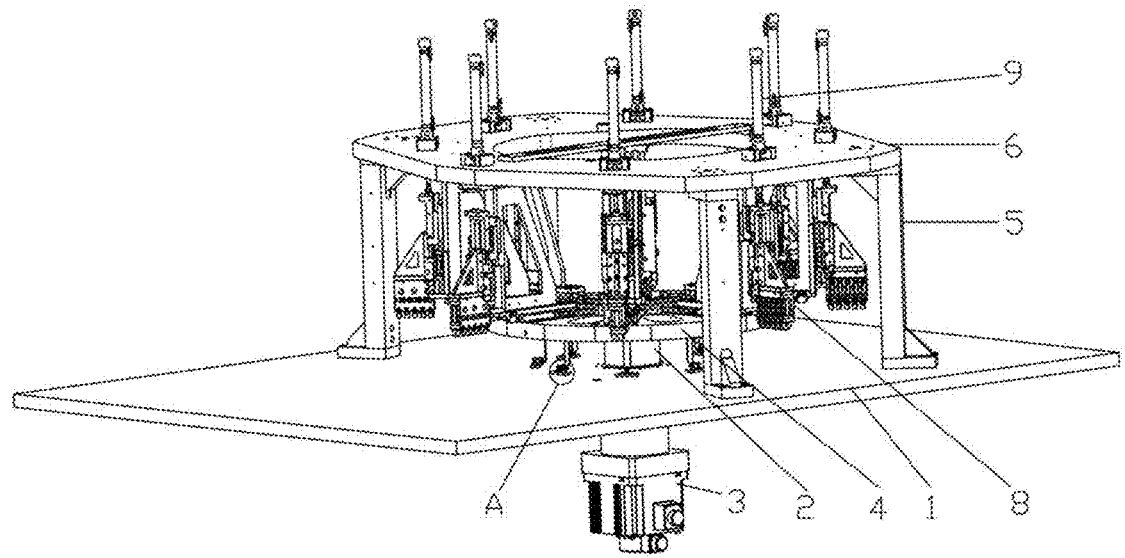
FIG. 1 is a schematic structural diagram of a multi-station cam carrying mechanism according to the present invention.

1—baseplate; 2—rotary shaft; 3—electric motor; 4—rotary plate; 5—mounting frame; 6—mounting plate; 7—sliding groove; 8—grabbing and transferring assembly; 9—air cylinder; 10—photoelectric switch; 11—stop plate; 12—transverse plate; 40—horizontal sliding rail; 41—first spring seat; 70—arc-shaped protruding portion; 71—first hole; 80—bracket; 81—horizontal sliding block; 82—vertical sliding rail; 83—vertical sliding block; 84—grabhook; 85—bearing; 86—horizontal spring; 87—vertical spring; 88—second spring seat; 90—drive rod; 800—upper limit stud; 801—lower limit stud; 802—second hole; and 830—limit stop block.

DETAILED DESCRIPTION

The present invention will be further described in detail below with reference to the embodiments, so that those skilled in the art can implement it according to the contents of the specification.

It should be understood that the terms such as "have", "include" and "comprise" as well as variants thereof used herein do not exclude the presence or addition of one or more other elements or combinations thereof.

As shown in FIGS. 1 to 6, a multi-station cam carrying mechanism of the present embodiment includes a baseplate 1, a rotary shaft 2 arranged in the middle of the baseplate 1, an electric motor 3 in driving connection with the bottom of the rotary shaft 2, a rotary plate 4 arranged at an upper part of the rotary shaft 2, mounting frames 5 arranged on the baseplate 1, a mounting plate 6 arranged on the mounting frames 5, an annular sliding groove 7 provided on a bottom face of the mounting plate 6 along a cam trajectory, and a plurality of grabbing and transferring assemblies 8 annularly and uniformly arranged at intervals, with bottom parts thereof being slidably arranged on the rotary plate 4 and top parts thereof being slidably arranged in the sliding groove 7.

With reference to FIG. 1, the mounting plate 6 is further provided with air cylinders 9 for driving grabhooks 84 on the grabbing and transferring assemblies 8 to undergo a vertical movement. The electric motor 3 is configured to drive the rotary plate 4 to rotate, so that the rotary plate 4 drives the grabbing and transferring assemblies 8 to undergo a reciprocating movement along the cam trajectory under the limitation of the sliding groove 7. The air cylinder 9 drives the grabbing and transferring assembly 8 to perform grabbing up and down. Thereby, a movement trajectory of the grabbing and transferring assembly 8 in the horizontal plane is the same as the trajectory of the shape of the sliding groove 7, and is of a straight line in the vertical direction. Multiple stations work simultaneously and can avoid obstacles between the two stations. The grabbing and transferring assembly 8 grabs and transfers the products sequentially to the next station according to the cam trajectory.

Figure 5:
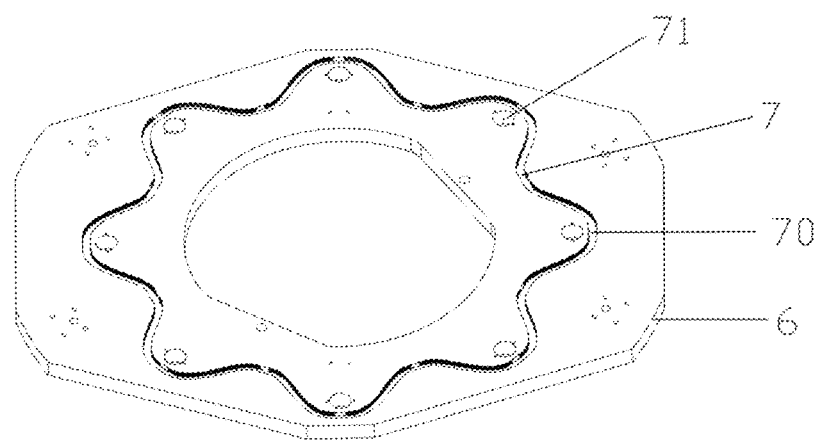
FIG. 5 is a schematic structural diagram of a bottom face of a mounting plate according to the present invention.

With reference to FIG. 1 and FIG. 5, in an embodiment, there are eight grabbing and transferring assemblies 8 annularly and uniformly arranged on the rotary plate 4 at intervals so as to form eight grabbing and transferring stations on the rotary plate 4. The sliding groove 7 includes eight arc-shaped protruding portions 70 annularly and uniformly arranged at intervals and respectively corresponding to positions of the grabbing and transferring assemblies 8.

Figure 2:
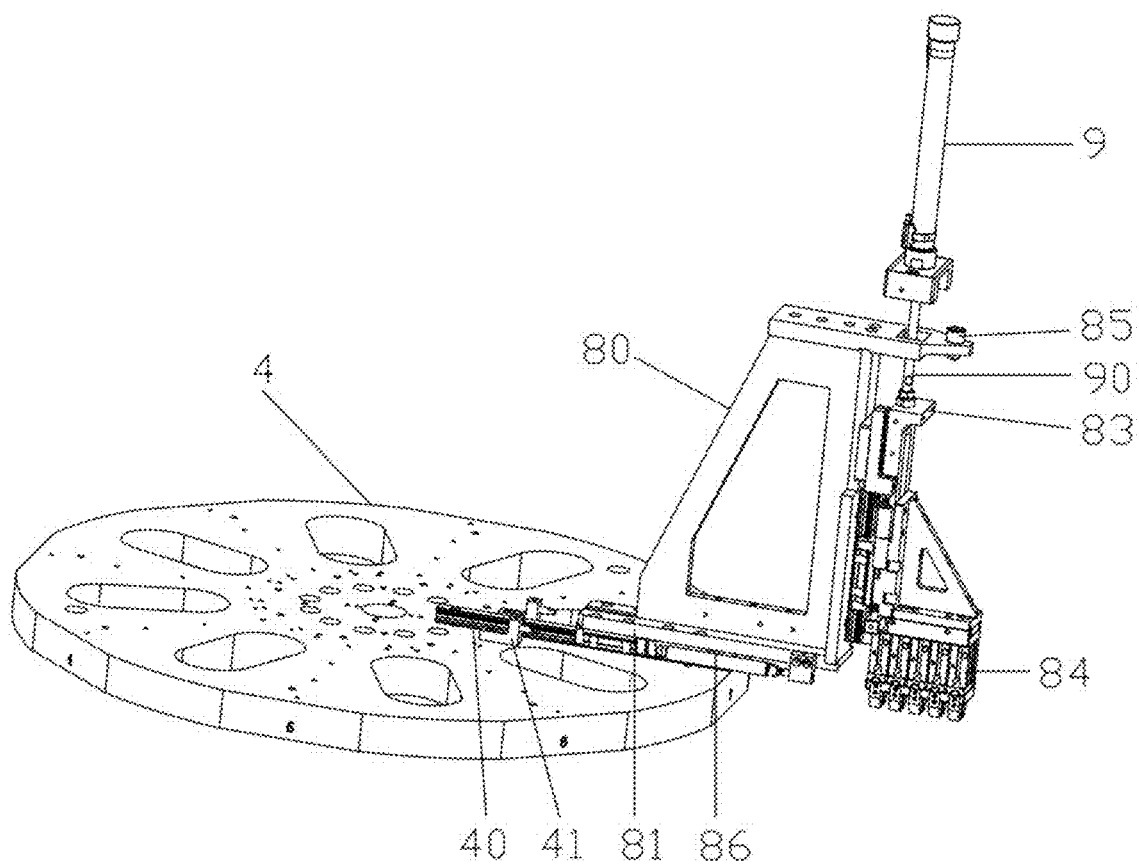
FIG. 2 is a schematic structural diagram of a grabbing and transferring assembly in cooperation with a rotary plate and an air cylinder according to the present invention.

With reference to FIG. 2, the grabbing and transferring assembly 8 includes a bracket 80, a horizontal sliding block 81 arranged at the bottom of the bracket 80, a vertical sliding rail 82 arranged on a side of the bracket 80, a vertical sliding block 83 slidably arranged on the vertical sliding rail 82, grabhooks 84 arranged on the vertical sliding block 83, and a bearing 85 arranged at the top of the bracket 80 and configured to be matched with and inserted in the sliding groove 7. When the bearing 85 slides in the sliding groove 7, it rotates by itself, which can reduce friction and facilitate sliding in the sliding groove 7. The rotary plate 4 is provided with a horizontal sliding rail 40 matched with the horizontal sliding block 81. The horizontal sliding block 81 is further connected to a horizontal spring 86, and the other end of the horizontal spring 86 is connected to a first spring seat 41 arranged on the rotary plate 4 (the figure shows the horizontal spring 86 in a state not mounted with the first spring seat 41). The horizontal spring 86 can provide a certain return power for the horizontal sliding block 81 to make the horizontal sliding block 81 slide more smoothly, and can also provide certain buffering and protecting functions for the grabbing and transferring assembly 8.

The electric motor 3 drives the rotary plate 4 to rotate through the rotary shaft 2, and the rotary plate 4 drives the grabbing and transferring assembly 8 thereon to rotate. Since the bearing 85 at the top of the grabbing and transferring assembly 8 is matched with and inserted in the sliding groove 7 and the horizontal sliding block 81 at the bottom of the grabbing and transferring assembly 8 is slidably arranged on the horizontal sliding rail 40 on the rotary plate 4, the bearing 85 can only slide in the sliding groove 7 along the trajectory of the shape of the sliding groove 7 and the horizontal sliding block 81 slides back and forth on the horizontal sliding rail 40. Thereby, the sliding groove 7 limits the bearing 85, and the horizontal sliding block 81 cooperates with the horizontal sliding rail 40, so that the grabbing and transferring assembly 8 undergoes a reciprocating movement along the cam trajectory. The movement trajectory of the grabbing and transferring assembly is the same as the trajectory of the shape of the sliding groove 7 as shown in the figure.

Figure 3:
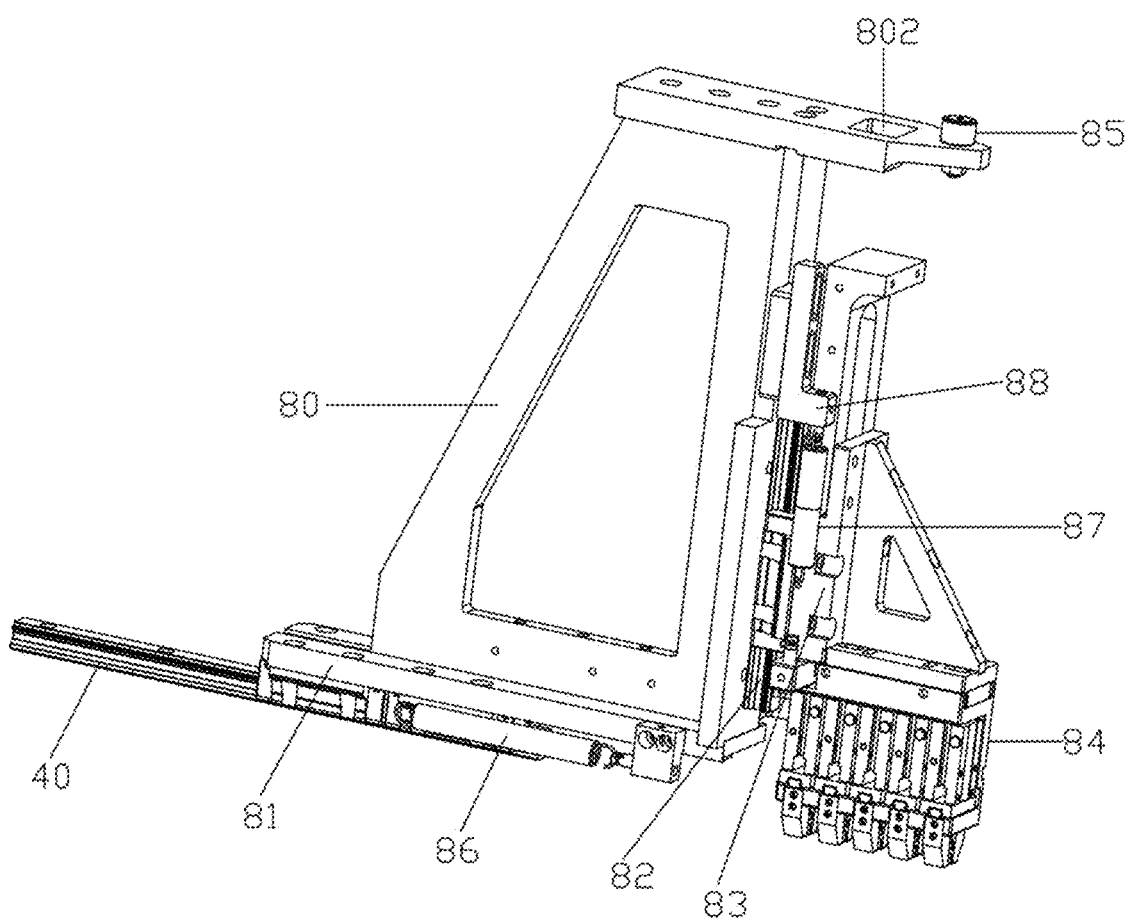
FIG. 3 is a schematic structural diagram of the grabbing and transferring assembly according to the present invention.

With reference to FIG. 2 and FIG. 3, the mounting plate 6 and the bracket 80 are both provided with holes, i.e. a first hole 71 and a second hole 802, for a drive rod 90 at a lower part of the air cylinder 9 to pass through. The drive rod 90 at the lower part of the air cylinder 9 is configured to sequentially pass through the first hole 71 in the mounting plate 6 and the second hole 802 in the bracket 80, and to press the vertical sliding block 83 so as to drive the grabhooks 84 on the vertical sliding block 83 to undergo a vertical reciprocating movement under the cooperation of the vertical spring 87. The bracket 80 is further connected to a vertical spring 87, and the other end of the vertical spring 87 is connected to a second spring seat 88 arranged on the vertical sliding block 83 (the figure shows the vertical spring 87 in a state not mounted with the second spring seat 88). The vertical spring 87 can provide an upward return power for the vertical sliding block 83 to realize the vertical sliding of the vertical sliding block 83, and can also provide certain buffering and protecting functions for the grabhooks 84.

When the grabbing and transferring assembly 8 rotates in the horizontal plane, the drive rod 90 at the lower part of the air cylinder 9 retracts upward and withdraws upward from the second hole 802 in a top plate of the bracket 80, thereby avoiding hindering the rotation of the grabbing and transferring assembly 8. When the grabbing and transferring assembly 8 transfers from one station to the next station and is in place, the second hole 802 in the top plate of the bracket 80 is aligned with the first hole 71 in the mounting plate 6, and the drive rod 90 at the lower part of the air cylinder 9 extends out downward, passes through the second hole 802 in the top plate of the bracket 80 and presses the top of the vertical sliding block 83, so that the vertical sliding block 83 is pushed to move downward and the grabhooks 84 on the vertical sliding block 83 perform a grabbing action. After the drive rod 90 retracts upward, under the action of upward pulling force of the vertical spring 87, the vertical sliding block 83 is pulled upward to the original position. The cycle is repeated.

Figure 6:
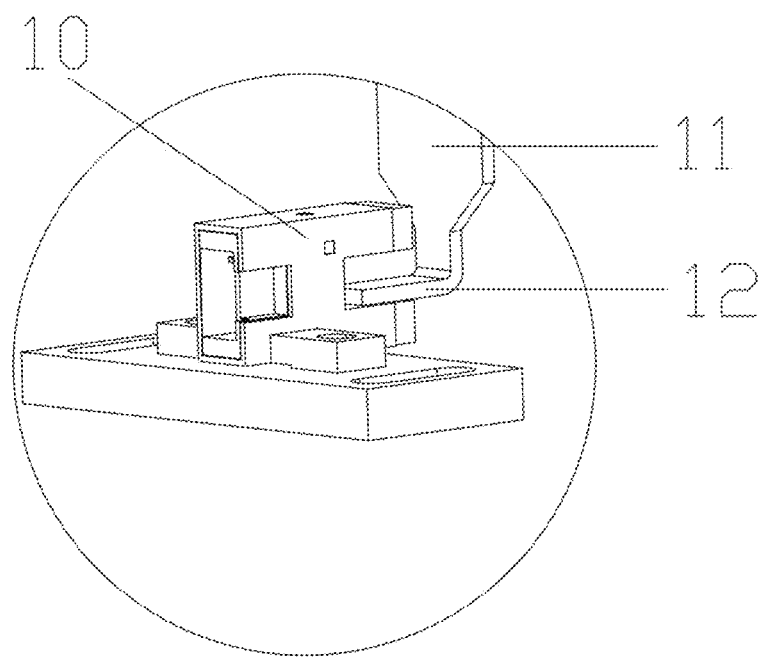
FIG. 6 is a partial enlarged schematic structural diagram of A in FIG. 1 according to the present invention.

With reference to FIG. 1 and FIG. 6, a surface of the baseplate 1 is provided with a photoelectric switch 10, and a bottom face of the rotary plate 4 directly below the grabbing and transferring assembly 8 is provided with a stop plate 11 matched with the photoelectric switch 10. The stop plate 11 is in an L shape, and a transverse plate 12 at the bottom thereof is configured to be matched with a detection groove on the photoelectric switch 10. That is, when the grabbing and transferring assembly 8 moves to a certain station and is in place, the transverse plate 12 at the bottom of the stop plate 11 is just located in the detection groove on the photoelectric switch 10, so that the photoelectric switch 10 triggers the signal and starts counting, and precise positioning of the stations can be ensured.

Figure 4:
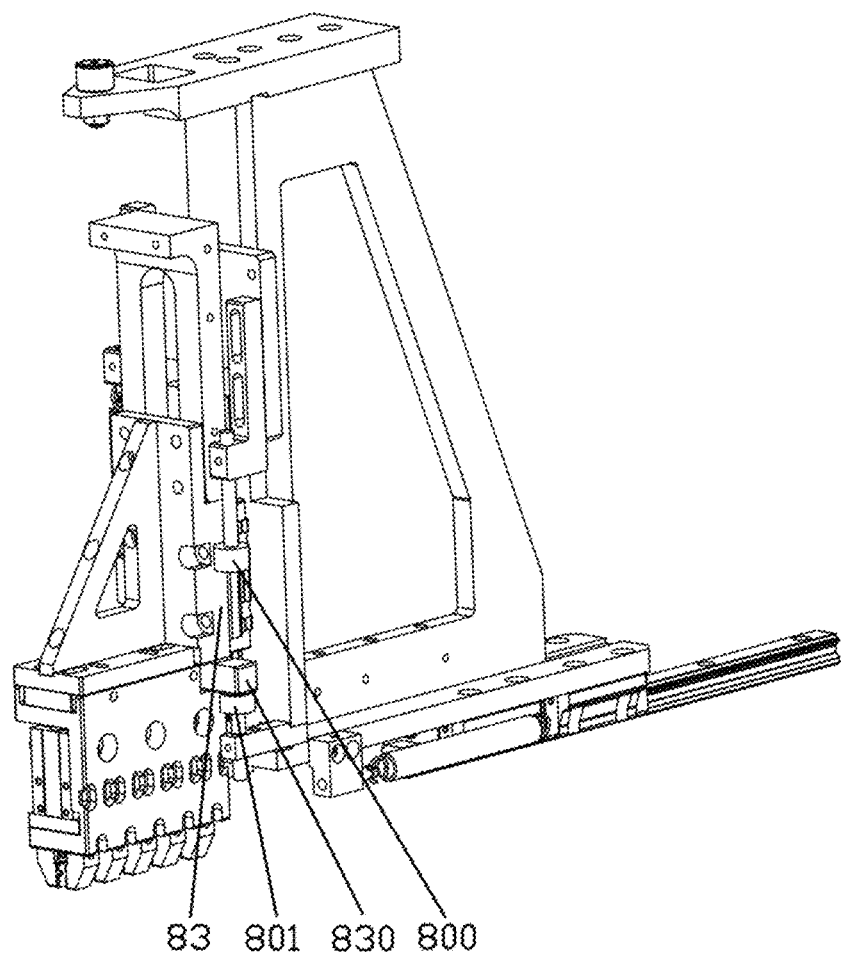
FIG. 4 is a schematic structural diagram of the grabbing and transferring assembly from another viewing angle according to the present invention.

With reference to FIG. 4, the side of the bracket 80 is further provided with an upper limit stud 800 and a lower limit stud 801, and a side of the vertical sliding block 83 is provided with a limit stop block 830 located between the upper limit stud 800 and the lower limit stud 801. The upper limit stud 800 and the lower limit stud 801 limit the upper and lower limit positions of the limit stop block 830, so as to realize the limit to the upper and lower sliding limit positions of the vertical sliding block 83, thereby ensuring smooth completion of the grabbing work of the stations on the one hand, and protecting the grabhooks 84 on the other hand.

The working principle of the present invention is as follows: the electric motor 3 drives the rotary plate 4 to rotate via the rotary shaft 2, and the rotary plate 4 drives the grabbing and transferring assembly 8 thereon to rotate. Since the bearing 85 at the top of the grabbing and transferring assembly 8 is matched with and inserted in the sliding groove 7 and the horizontal sliding block 81 at the bottom of the grabbing and transferring assembly 8 is slidably arranged on the horizontal sliding rail 40 on the rotary plate 4, the grabbing and transferring assembly 8 undergoes a reciprocating movement along the cam trajectory. When the grabbing and transferring assembly 8 rotates in the horizontal plane, the drive rod 90 at the lower part of the air cylinder 9 retracts upward and withdraws upward from the second hole 802 in the top plate of the bracket 80, thereby avoiding hindering the rotation of the grabbing and transferring assembly 8. When the grabbing and transferring assembly 8 transfers from one station to the next station and is in place, the second hole 802 in the top plate of the bracket 80 is aligned with the first hole 71 in the mounting plate 6, and the drive rod 90 at the lower part of the air cylinder 9 extends out downward, passes through the second hole 802 in the top plate of the bracket 80 and presses the top of the vertical sliding block 83, so that the vertical sliding block 83 is pushed to move downward and the grabhooks 84 on the vertical sliding block 83 perform a grabbing action. After the drive rod 90 retracts upward, under the action of upward pulling force of the vertical spring 87, the vertical sliding block 83 is pulled upward to the original position. The cycle is repeated. That is, while the grabbing and transferring assemblies 8 undergo a reciprocating movement along the cam trajectory, the grabhooks 84 on the grabbing and transferring assemblies 8 undergo a vertical reciprocating movement so as to grab and transfer the products, so that the products are sequentially transferred from one station to the next station.

Although the implementation scheme of the present invention has been disclosed above, it is not only limited to the applications listed in the specification and implementations, but also can be applied to various fields suitable for the present invention. For those skilled in the art, additional modifications can be easily realized, so the present invention is not limited to specific details without departing from the general concepts defined by the claims and equivalent scope.

What is claimed is:

1. A multi-station cam carrying mechanism, comprising a baseplate, a rotary shaft arranged in the middle of the baseplate, an electric motor in driving connection with the bottom of the rotary shaft, a rotary plate arranged at an upper part of the rotary shaft, mounting frames arranged on the baseplate, a mounting plate arranged on the mounting frames, an annular sliding groove provided on a bottom face of the mounting plate along a cam trajectory, and a plurality of grabbing and transferring assemblies annularly and uniformly arranged at intervals, with bottom parts thereof being slidably arranged on the rotary plate and top parts thereof being slidably arranged in the sliding groove, wherein the electric motor is configured to drive the rotary plate to rotate so as to drive the grabbing and transferring assemblies to undergo a reciprocating movement along the cam trajectory under the limitation of the sliding groove; and the mounting plate is further provided with air cylinders for driving grabhooks on the grabbing and transferring assemblies to undergo a vertical movement.

2. The multi-station cam carrying mechanism according to claim 1, wherein the grabbing and transferring assembly comprises a bracket, a horizontal sliding block arranged at the bottom of the bracket, a vertical sliding rail arranged on a side of the bracket, a vertical sliding block slidably arranged on the vertical sliding rail, grabhooks arranged on the vertical sliding block, and a bearing arranged at the top of the bracket and configured to be matched with and inserted in the sliding groove.

3. The multi-station cam carrying mechanism according to claim 2, wherein the rotary plate is provided with a horizontal sliding rail matched with the horizontal sliding block.

4. The multi-station cam carrying mechanism according to claim 3, wherein the horizontal sliding block is further connected to a horizontal spring, and the other end of the horizontal spring is connected to a first spring seat arranged on the rotary plate.

5. The multi-station cam carrying mechanism according to claim 2, wherein the bracket is further connected to a vertical spring, and the other end of the vertical spring is connected to a second spring seat arranged on the vertical sliding block.

6. The multi-station cam carrying mechanism according to claim 5, wherein the mounting plate and the bracket are both provided with holes for a drive rod at a lower part of the air cylinder to pass through, and the drive rod at the lower part of the air cylinder is configured to press the vertical sliding block so as to drive the grabhooks on the vertical sliding block to undergo a vertical reciprocating movement under the cooperation of the vertical spring.

7. The multi-station cam carrying mechanism according to claim 1, wherein a surface of the baseplate is provided with a photoelectric switch, and a bottom face of the rotary plate directly below the grabbing and transferring assembly is provided with a stop plate matched with the photoelectric switch.

8. The multi-station cam carrying mechanism according to claim 2, wherein the side of the bracket is further provided with an upper limit stud and a lower limit stud, and a side of the vertical sliding block is provided with a limit stop block located between the upper limit stud and the lower limit stud.

9. The multi-station cam carrying mechanism according to claim 1, wherein there are eight grabbing and transferring assemblies annularly and uniformly arranged on the rotary plate at intervals so as to form eight grabbing and transferring stations on the rotary plate.

10. The multi-station cam carrying mechanism according to claim 9, wherein the sliding groove comprises eight arc-shaped protruding portions annularly and uniformly arranged at intervals and respectively corresponding to positions of the grabbing and transferring assemblies.

\* \* \* \* \*